Oct. 5, 1965 F. W. STEPHENSON 3,209,393
DEVICE FOR DEHEADING SHRIMP
Filed Feb. 5, 1964 2 Sheets-Sheet 1
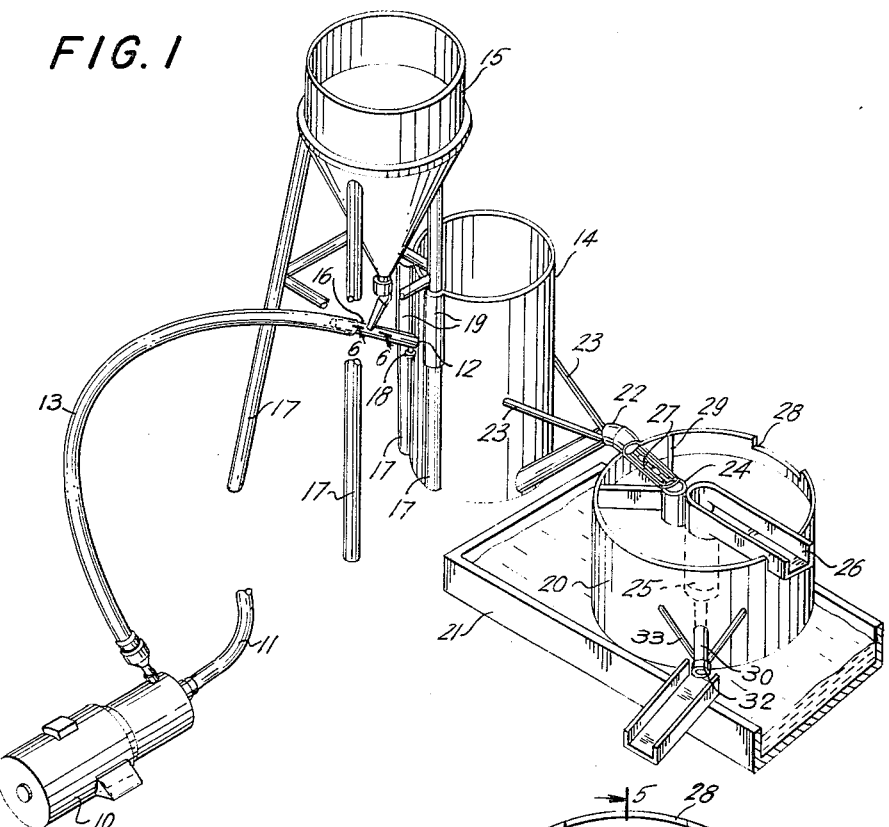
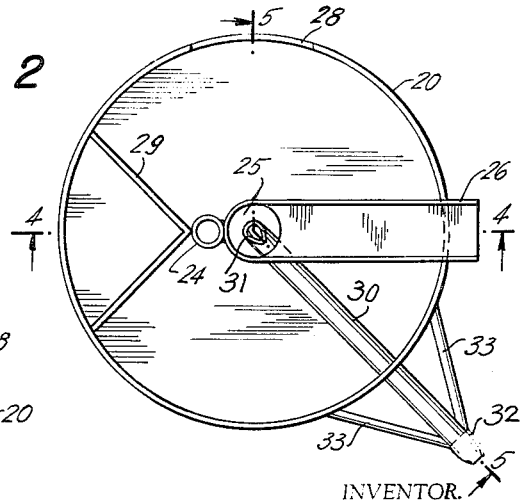
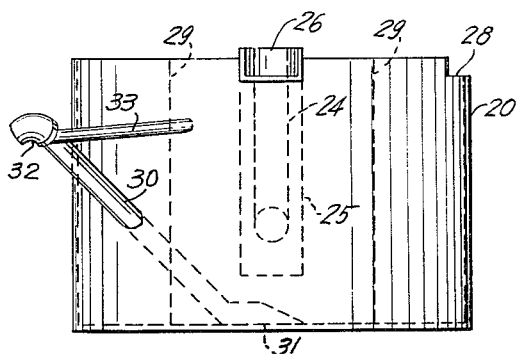
INVENTOR.
FRED W. STEPHENSON
BY
Kane, Dalsimer & Kane
ATTORNEYS Oct. 5, 1965    F. W. STEPHENSON    3,209,393
DEVICE FOR DEHEADING SHRIMP Filed Feb. 5, 1964    2 Sheets-Sheet 2

INVENTOR.
FRED W. STEPHENSON
BY
Kane, Dalsimer & Kane
ATTORNEYS

United States Patent Office 3,209,393
Patented Oct. 5, 1965

3,209,393
DEVICE FOR DEHEADING SHRIMP
Fred W. Stephenson, Jupiter, Fla., assignor to Process Engineering Corporation, Jupiter, Fla., a corporation of Florida
Filed Feb. 5, 1964, Ser. No. 342,634
9 Claims. (Cl. 17—2)

This invention relates generally to a device for deheading fish and more particularly to a device for deheading shrimp and automatically separating the severed head from the remaining parts of the shrimp.

This invention is described in terms of deheading shrimp by way of example only and it should be understood that other fish can be deheaded by utilization of the device described herein without departing from the scope of the invention as defined by the claims.

The invention herein has as its principal object the provision of a device for separating the head of a shrimp from the body without handling.

A further object of this invention is to provide a device for practicing the method which is free of moving parts.

Another object of the invention is to provide a device which can be used by anyone without special skill or knowledge.

Still a further object of the invention is to provide a device which is relatively simple to assemble and operate without critical conditions of operability and which can be operated under all environmental conditions including aboard ship.

A device for deheading shrimp embodying the invention and for practicing the method and the manner of using the same is described herein with references to the drawings, in which:

FIG. 1 is a perspective view of a device for deheading shrimp constructed in accordance with the teachings of this invention;

FIG. 2 is a segmentary plan view of the separator portion of the device shown in FIG. 1;

FIG. 3 is a segmentary elevational view of the separator portion as viewed from the right in FIG. 2;

Figure 4:
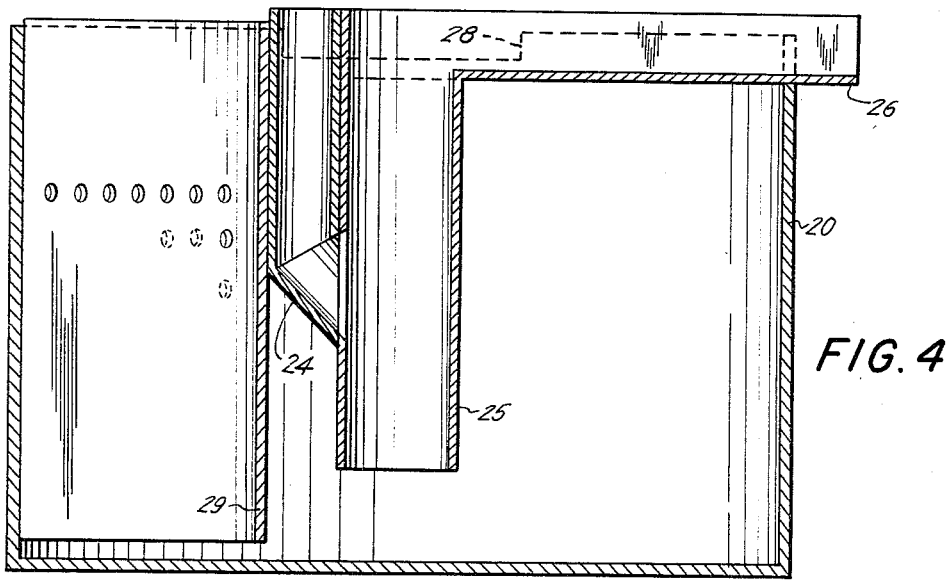
FIG. 4 is a partially sectional view on an enlarged scale taken along the line 4—4 in the direction of the arrows as indicated in FIG. 2.
Figure 5:
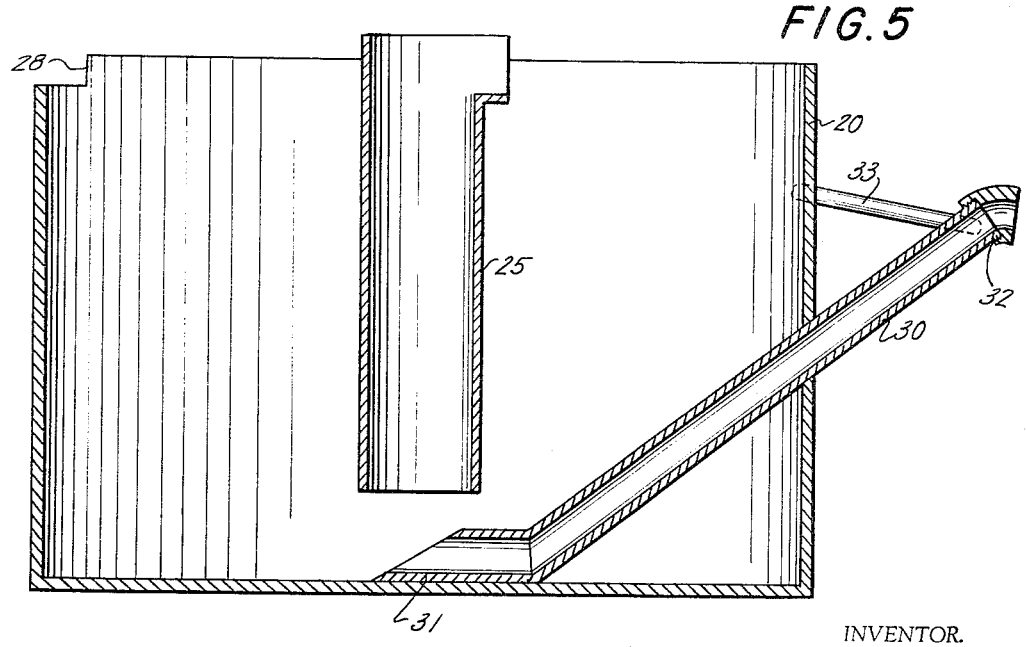
FIG. 5 is a partially sectional view on an enlarged scale taken along the line 5—5 in the direction of the arrows as indicated in FIG. 2.
Figure 6:
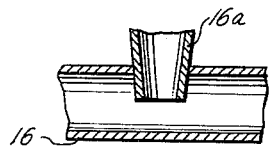
FIG. 6 is a partially sectional view on an enlarged scale taken along the line 6—6 in the direction of the arrows as indicated in FIG. 1.

In the FIGURES, pump 10 is shown receiving water at input hose 11 and discharging it at a greatly increased high velocity head through nozzle 12 and connected to output hose 13 into receiving tank 14.

Feeder tank 15 is connected by a velocity head connection 16 to nozzle 12 so that it can also discharge its contents, which are ejected into the high velocity flow of water of output hose 13, into receiving tank 14. Part 16a projecting downwardly from the feeder tank projects into the water flow in such a way that the shrimp are released into the center (or near it) where the velocity of flow is greatest. The feeder tank is supported by legs 17 above hose 13 for gravity feed therein and water is supplied to tank 15. The source of water supply to tank 15 can be a second output hose attached to pump 10 or any suitable source. Valve 18 is provided at nozzle 12 and the forward legs 17 which are supporting tank 15 are attached to tank 14 by brackets 19 to provide a spaced relationship and to maintain nozzle 12 projecting within the tank 14.

Separator tank 20 positioned in trough 21 is provided to receive the output of tank 14 through pipe 22 which connects with tank 14 near the bottom thereof and which opens over tank 20. Pipe 22 is inclined upwardly and maintained in position by struts 23 fastened to receiving tank 14.

The separator tank 20 includes a standpipe 24 which connects with separator pipe 25 about midway thereof. The separator pipe is large in diameter and disposed vertically with its lower end spaced above the bottom of tank 20 so that water injected into tank 20 by pipe 22, or any other suitable means, can flow upwardly within pipe 25 and out trough 26. Slide 27 bridges the space between pipe 22 and the upper open end of standpipe 24 and an overflow slot 28 is provided in the wall of tank 20.

Vertical perforated baffle 29 extends upwardly from a point above the bottom of tank 20 to approximately the upper termination of the tank wall with its apex adjacent standpipe 24 and its side edges adjacent the inner surface of the tank wall. The purpose of the baffle will become evident when the explanation of the operation of the device is considered below.

Evacuation pipe 30 projects through the side of tank 20 with its lower end 31 beneath separator pipe 25 and its upper end terminating outside of tank 20 at a level slightly beneath the water level in the tank which is maintained substantially constant due to overflow slot 28. In the figures the upper end of the suction pipe is indicated by the numeral 32 and the pipe is maintained at a proper angle by struts 33 fastened to tank 20. The overflow slot is above the level of the bottom of trough 26.

The practice of the method and operation of the apparatus will now be described. The device and method removes and disposes of the heads of shrimp from the tails and is basically a continuous flow device having no moving parts in the unit which actually heads the shrimp and separates the head from the body. The shrimp are dropped into hopper 15 which is filled with water, or continually filled with water, and are conducted down by gravity to velocity head connection 16 through which water is being forced at a high velocity under pressure by the pump 10. The separation of the heads from the tails takes place when the shrimp which are slowly drifting down are suddenly introduced into the high velocity stream of water at connection 16. The body cavity of shrimp is partially between the head and tail so that the high velocity is sufficient to loosen and separate the heads. The mixture of heads, tails and water is released through nozzle 12 into tank 14 from which they are forced upwardly through pipe 22 due to the continuing influx of water under velocity head from nozzle 12 into tank 14. The flow of water out of tank 14 through pipe 22 pulls the tails and heads at a rate of speed much higher than either heads or tails sink so they are virtually sucked out of the bottom of the tank. The water level in tank 14 is quite a distance above the outlet (or top) of pipe 22 due to the large volume of water introduced by nozzle 12, aiding the high rate of flow through the pipe.

The principle of operation of the separator is based on the fact that the tails sink faster than the heads in water. The mixed heads and tails are fed onto slide 27 which empties into the standpipe 24.

A portion of the water ejected from pipe 22 overflows the slide 27 and drops into the tank 20 behind baffle 29. The mixed heads and tails within standpipe 24 empty into separator pipe 25 through which water is flowing upwardly and out trough 26. This water flows up at a constant rate which is faster than the heads can sink but slower than the tails sink, therefore, the heads are carried up and out the trough and the tails sink to the bottom. In order to maintain a constant rate of flow through this separator pipe it is placed in the large tank 20 in which the water level is substantially constant so that there is substantially constant flow up the pipe and out the trough. The supply of water is always more than sufficient so that there is always some overflow. When the tails fall to the bottom of the tank they are removed by pipe 30 which goes up through the side of the tank. The perforated baffle 29 is used to diminish turbulence.

Thus it is seen that no handling is required; there are no moving parts with the exception of the pump, and the shrimp can be fed at random into the device. It is the sudden entrance of the shrimp into the high velocity stream which accomplishes the separation of heads from tails and it does not matter whether the head or tail enters the stream first. The device is simple to operate, the method is easy to practice and the unit can be operated under substantially all environmental conditions.

Thus, among others, the several objects in the invention as specifically aforenoted, are achieved. Obviously, numerous changes in construction and rearrangement of parts might be resorted to without departing from the spirit of the invention as defined by the claims.

I claim:

1. A device for severing and separating shrimp heads and bodies including in combination means for providing a high velocity stream of water, means for introducing said shrimp into said stream to separate said heads and said bodies, a hollow separator pipe, a bottom end of said separator pipe, an upper end of said separator pipe in a plane above the plane of said bottom end, means providing an upstream of water in said separator pipe moving from said bottom end to said upper end and means for introducing said heads and bodies into said upstream.

2. A device for severing and separating shrimp heads and bodies in accordance with claim 1 in which said means for providing the high velocity stream of water is in a hose and the means for introducing said shrimp into said stream consists of a hopper above said hose with shrimp and water therein with a connection into said hose so that the shrimp and water can enter into the stream by gravity feed.

3. A device for severing and separating shrimp heads and bodies in accordance with claim 1 in which the means for introducing the heads and bodies into said upstream consists of a standpipe open at its upper end into which said heads and bodies are injected and whose lower end is connected to said separator pipe.

4. A device for severing and separating shrimp heads and bodies in accordance with claim 3 in which the separator pipe is disposed in a water filled tank with its upper end above the water level which is maintained constant and said upstream has a constant velocity.

5. A device for severing and separating shrimp heads and bodies in accordance with claim 1 in which said separator pipe is provided with a trough on its upper end for receiving said heads and an evacuation means adjacent its lower end for removing said bodies.

6. A device for severing and separating shrimp heads and bodies including in combination means for providing a high velocity stream of water, means for introducing said shrimp into said stream, a separator tank, an overflow slot provided in said separator tank for constantly maintaining a level of water in said tank, a separator pipe vertically disposed in said tank with its bottom end spaced from the bottom of said tank, means providing an upstream of water in said separator pipe, a trough provided at the upper end of said separator pipe, an evacuation means adjacent the lower end of said separator pipe, a standpipe connected to said separator pipe, and means for introducing said shrimp heads and bodies into said standpipe whereby said heads and bodies through gravity force enter said separator pipe and said bodies go to the bottom thereof for removal by said evacuation means and said heads float to the top thereof into said trough.

7. A device for severing and separating shrimp heads and bodies in accordance with claim 6 in which said means for providing the high velocity stream of water is a hose, and a pump is provided for maintaining the velocity of the stream.

8. A device for severing and separating shrimp heads and bodies in accordance with claim 6 in which the means for introducing said heads and bodies into said standpipe consists of a receiving tank receiving said severed heads and bodies, a connecting pipe from said receiving tank to said separator tank and a slide from said connecting pipe to said standpipe.

9. A device for severing and separating shrimp heads and bodies in accordance with claim 8 in which a vertically disposed perforated baffle is provided beneath the slide sectioning said separator tank.

References Cited by the Examiner

UNITED STATES PATENTS 2,534,767 12/50 Greiner et al. _____ 17—45
2,794,209 6/57 Self _____ 17—2

SAMUEL KOREN, *Primary Examiner.*

LUCIE H. LAUDENSLAGER, *Examiner.*